United States Patent Office 2,953,804
Patented Sept. 27, 1960

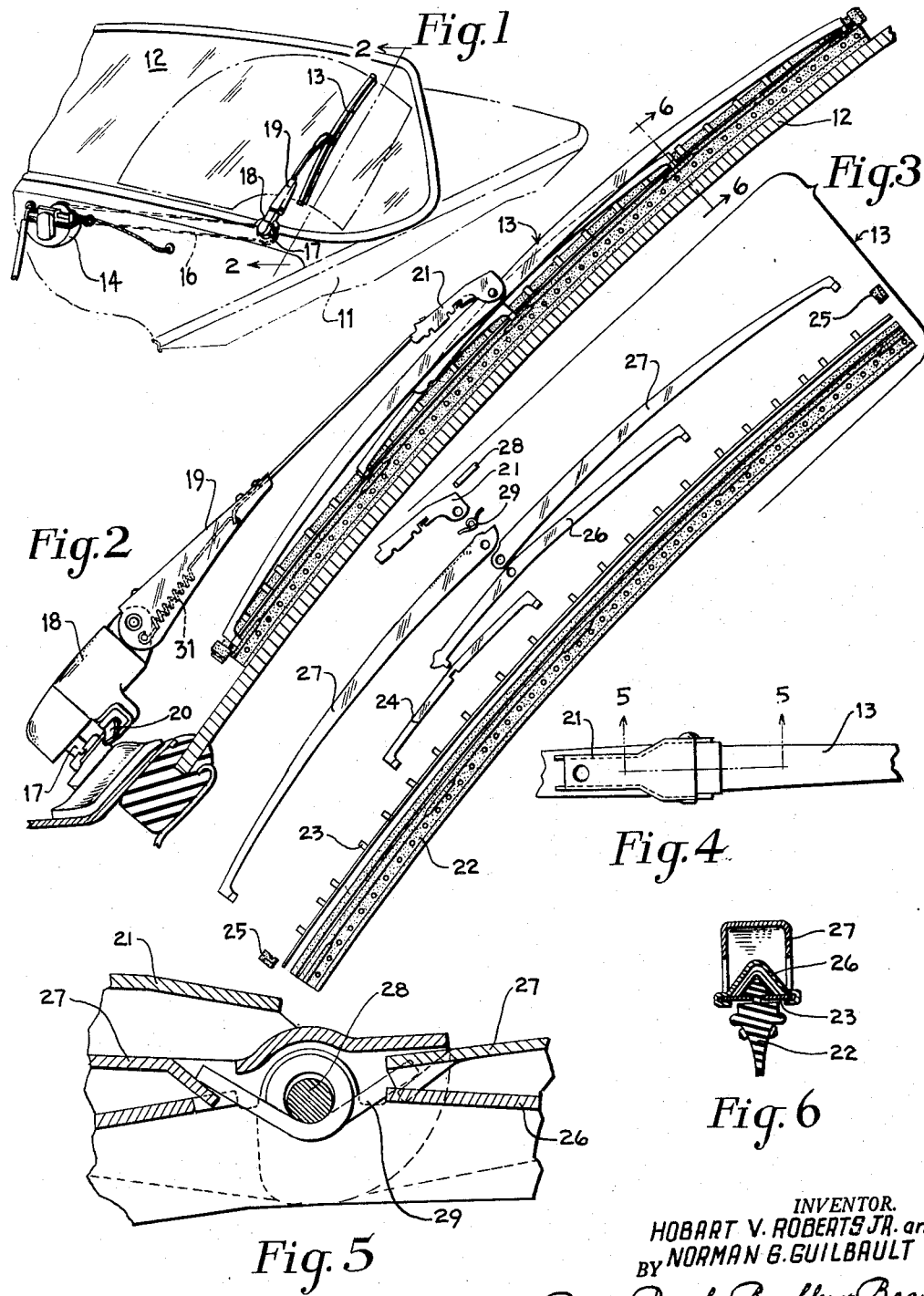

2,953,804

WINDSHIELD WIPER

Hobart V. Roberts, Jr., Elma, and Norman G. Guilbault, Buffalo, N.Y., assignors to Trico Products Corporation, Buffalo, N.Y.

Filed July 5, 1956, Ser. No. 595,960

7 Claims. (Cl. 15—250.42)

This invention relates to windshield wipers for use on motor vehicles.

In the design of present day motor vehicles, and particularly in those having the panoramic or wraparound type of windshield, the tendency has been toward development of larger windshield glass areas necessitating, among other things, windshield wipers of greater length. Windshield wiper blades of over twelve inches in length pose serious problems in design because of the difficulty in obtaining uniform pressure distribution throughout the full length of the blade. In addition to uniform pressure distribution, the development of a low silhouette wiper blade super-structure is desirable to minimize wind-lift and operating resistance.

The windshield wiper of the present invention provides a practical solution to the problem of wiper blades of over twelve inches in length for use on motor vehicles having a panoramic type windshield. The wiper super-structure incorporates a plurality of nested levers, including a pair of dominating levers hinged end to end, which nested levers are adapted to automatically divide and distribute wiper arm pressure uniformly along the full length of the wiper blade.

The main object of this invention is to provide an improved windshield wiper for use on vehicles having wraparound windshields of increased glass area.

A further object of this invention is to provide a vehicle windshield wiper blade of increased length which will divide and distribute wiper arm pressure uniformly along the full length of the wiper blade.

Another object of the invention is to provide a windshield wiper blade of increased length which has a relatively low silhouette to minimize wind-lift and operating resistance.

These and further objects and features of the invention will become more apparent from the following description and the accompanying drawing wherein:

Fig. 1 is a fragmentary schematic view of a motor vehicle having a windshield wiper incorporating the principles of the invention;

Fig. 2 is an enlarged view as seen from line 2—2 in Fig. 1;

Fig. 3 is an exploded view of the windshield wiper of Fig. 1;

Fig. 4 is a fragmentary plan view of the windshield wiper of Fig. 1;

Fig. 5 is an enlarged view as seen from line 5—5 in Fig. 4; and

Fig. 6 is an enlarged sectional view as seen from line 6—6 in Fig. 2.

Referring now to the drawing, the numeral 11 identifies a motor vehicle having a windshield 12, of the panoramic or wraparound type on which is operatively arranged a wiper blade assembly 13 embodying the principles of the invention. A wiper motor 14, which may be of the conventional vacuum operated type, is connected by a flexible transmission means, such as cables 16, to a drive shaft assembly 17 upon which is mounted a wiper arm supporting head 18. The latter has pivotally affixed thereto a wiper arm 19, which is removably connected to the wiper blade assembly 13 by means of a bayonet clip 21 such as is claimed in copending patent application Serial No. 375,984, filed August 24, 1953, now Patent No. 2,807,822, dated October 1, 1957. A cam mechanism 20, arranged between the arm supporting head 18 and the drive shaft assembly 17, is adapted to maintain the wiper blade assembly 13 normal to the windshield as it reciprocates thereupon; further description of such cam assembly may be found in the patent to J. R. Oishei et al., No. 2,691,186.

The wiper blade assembly 13 includes a rubber squeegee 22 supported along its length in a flexible member 23 which serves as a vertebra affording bending of the squeegee to and fro relative its narrow wiping edge. A pair of end pieces 25 fit upon the end of the flexible member 23 to keep the squeegee from sliding off of the flexible member. A plurality of nesting lever members are arranged for the operative support of the flexible member 23, said lever members having: a lever 24, each end of which is formed to grasp the edges of flexible member 23 to allow sliding movement thereof along its longitudinal axis; a lever 26, one end of which pivotally engages the mid-portion of lever 24, the other end of which is formed to grasp the edge of flexible member 23 in the same manner as the ends of lever 24; and a pair of levers 27, one end of each being pivoted upon a pin member 28, the opposite end of each being formed to grasp the edges of the flexible member 23 in the same manner as the ends of lever 24. It is to be noted that the lengthwise dimensions of the levers 24, 26, and 27, are such as to divide the flexible member 23 into four equal lengths; or in other words, to provide equal distance between each of the five lever gripping contacts with the flexible member.

The lever 26 is pivotally affixed to the pin member 28 at a point one-third of its overall length from the end which engages the lever 24, thus forming a lever of the first class with a two-to-one force ratio between the ends thereof. The bayonet clip 21 is also pivotally affixed to the pin member 28. A torsion spring 29, surrounding the pin member 28, has its ends engaging the levers 27 to urge the latter to swing about the pin member in the direction of the squeegee 22; rotary movement of the levers 27 in a reverse direction occurs only upon overcoming the torsional resistance of the spring 29.

The wiper blade assembly automatically operates to provide uniform pressure along the full length of the blade in the following manner. Assume that the loading of the wiper arm 19, by virtue of a tension spring 31, is such as to exert a pressure of fifteen ounces upon the pin member 28 in a direction of the windshield. The torsion spring 29, which had been selected to provide a resistance of six ounces, will thus distribute a three ounce force at each end of the levers 27. The remaining nine ounces of wiper arm pressure will be equally distributed upon the three backing strip pressure applying ends of levers 24 and 26 at points of contact with the flexible member 23 thus providing a force of three ounces at each point of contact.

Accordingly, it is seen that the arrangement of the levers 24, 26, and 27 will automatically result in the distribution of a fifteen ounce force, acting upon the pin member in a direction of the windshield, into a force of three ounces acting at each of the five points of contact upon the flexible member, thereby providing a uniform pressure of the squeegee upon the windshield.

The manner of arranging the levers comprising the wiper arm assembly assures full flexibility whereby uniform blade pressure is achieved as the squeegee moves over and is accommodated to windshield contour variations during windshield wiping. In addition, the nesting feature afforded by the levers provides a compact assemblage wherein a low wiper blade silhouette is achieved, thus reducing wind drag and avoiding windliftage during wiper operation.

The foregoing description has been given in detail without thought of limitation since the inventive principles involved are capable of assuming other physical embodiments without departing from the spirit of the invention and the scope of the appended claims.

What is claimed is:

1. A windshield wiper including an elongated wiper body, a flexible member for the support of the wiper body, and a plurality of nesting lever members having end portions adapted to slidingly engage the flexible member and to distribute a wiper load equally upon the end portions, said lever members including dominating lever members spanning the wiper body in end to end relation and pivotally connected at their inner ends by spring hinge means urging their outer ends toward the wiper body, and multiple additional lever members pivoting on the spring hinge means and on each other, said end portions being arranged at substantially equal distances along the length of the flexible member.

2. A windshield wiper including a squeegee, a flexible member for the support of the squeegee, and a plurality of nesting lever members having end portions adapted to slidingly engage the flexible member and to distribute a wiper load substantially equally upon said end portions, said lever members including a pair of dominating lever members extending lengthwise of the squeegee in end-to-end relation and pivotally connected at their inner ends by spring hinge means, and said end portions being arranged to define the length of the flexible member into four areas of substantially equal length.

3. A windshield wiper comprising an elongated wiper body, a flexible member for the support of the elongated wiper body, a pair of lever members pivoted at one end thereof upon a pin member and slidably engaging the flexible member at their other ends, spring means urging said pair of lever members about the pin member toward the flexible member, a third lever member pivoted intermediate its ends upon the pin member and arranged for nesting within the pair of lever members, one end of said third lever member slidably engaging the flexible member, and a fourth lever member pivotally affixed to the other end of the third lever member and arranged for partially nesting in the third lever member, said fourth lever member slidably engaging at each end the flexible member.

4. A windshield wiper comprising an elongated wiper body, a flexible member for the support of the elongated wiper body, a pair of lever members pivoted at one end upon a pin member and slidably engaging the flexible member at each of the other ends, a torsion spring arranged to urge said lever members about the pin member in the direction of the flexible member, a third lever member pivoted upon the pin member and arranged for nesting within the pair of lever members, said third lever member slidably engaging at one end the flexible member, and a fourth lever member pivotally affixed to the free end of the third lever member and arranged for partial nesting in the third member, said fourth lever member engaging at each end the flexible member, said lever members being arranged to engage the flexible member at equally spaced points along the length thereof.

5. A windshield wiper comprising a squeegee, a flexible body member forming a vertebra for the operative support of the squeegee, a pair of lever members pivoted at an inboard end to a pin member and slidably engaging at the outboard ends the flexible body member, a torsion spring surrounding the pin member and having its ends engaging the lever members to urge the outboard ends thereof in the direction of the flexible member, a third lever member pivotally supported upon the pin member at a distance of one-third its length from an end thereof, said third lever member arranged for nesting in the pair of lever members and slidably engaging the flexible member at the end of the third lever farthest removed from the pin member, and a fourth lever member pivotally supported at its midpoint by the free end of the third lever, the ends of said fourth member being arranged for slidably engaging the flexible member, said lever members being arranged to engage the flexible member at equally spaced points along the length thereof.

6. A windshield wiper comprising a squeegee, a flexible body member for the operative support of the squeegee, and a plurality of pressure distributing nesting lever members having end portions slidably engaging the body member at each end of the body member, at the midpoint of the body member and midway between the midpoint and each end of the body member, said lever members being adapted to uniformly distribute wiper loading between the lever end portions and including dominating lever members spanning the squeegee in end to end relation and pivotally connected at their inner ends by spring hinge means urging their outer ends toward the body member.

7. A wiper for curved windshields, comprising a flexible blade having a surface conforming flexible backing strip, a superimposed pair of levers connected end to end by a spring hinge to depress the outer ends of the levers upon the blade and being adapted for mounting on a spring loaded actuating arm under a spring urge dominating the reactive urge of the spring hinge, and pressure distributing means including multiple pressure equalizing lever members pivoting on the spring hinge and on each other and extending lengthwise of the levers for distributing to the blade the arm spring pressure as modified by the spring hinge, the opposite ends of the rocker means being arranged to grasp the opposite side margins of the strip and to engage the upper and lower faces thereof at longitudinally spaced points between the outer ends of the levers.

References Cited in the file of this patent

UNITED STATES PATENTS

| | | |
|---|---|---|
| 2,702,397 | Oishei | Feb. 22, 1955 |
| 2,706,291 | Rappl | Apr. 12, 1955 |
| 2,739,336 | O'Shei | Mar. 27, 1956 |
| 2,751,619 | Chambers | June 26, 1956 |
| 2,752,626 | Oishei | July 3, 1956 |
| 2,772,436 | Deibel | Dec. 4, 1956 |

FOREIGN PATENTS

| | | |
|---|---|---|
| 1,033,521 | France | Apr. 1, 1953 |

UNITED STATES PATENT OFFICE
CERTIFICATE OF CORRECTION

Patent No. 2,953,804                 September 27, 1960

Hobart V. Roberts, Jr., et al.

It is hereby certified that error appears in the above numbered patent requiring correction and that the said Letters Patent should read as corrected below.

Column 4, line 48, for "rocker" read -- pressure distributing --.

Signed and sealed this 3rd day of October 1961.

(SEAL)
Attest:

ERNEST W. SWIDER
Attesting Officer

DAVID L. LADD
Commissioner of Patents
USCOMM-DC